United States Patent [19]
Finneran

[11] 3,828,533
[45] Aug. 13, 1974

[54] ROTARY MOWER

[76] Inventor: John L. Finneran, 1724 Turtle Creek North Dr., South Bend, Ind. 46637

[22] Filed: Nov. 2, 1972

[21] Appl. No.: 303,095

[52] U.S. Cl. ............................................. 56/320.2
[51] Int. Cl. ........................................... A01d 35/26
[58] Field of Search ......... 56/16.7, 16.9, 17.4, 17.5, 56/202, 255, 320.1, 320.2, DIG. 12, DIG. 13

[56] References Cited
UNITED STATES PATENTS

| | | | |
|---|---|---|---|
| 1,379,555 | 5/1921 | Goodfellow | 56/DIG. 12 |
| 2,198,526 | 4/1940 | Cockburn | 56/320.2 |
| 2,495,032 | 1/1950 | Stuhl | 56/320.2 X |
| 2,547,328 | 4/1951 | Koch et al. | 56/17.5 X |
| 2,983,096 | 5/1961 | Phelps | 56/320.2 X |
| 3,006,128 | 10/1961 | Weiland | 56/320.2 X |
| 3,029,582 | 4/1962 | De Halleux | 56/320.2 X |
| 3,049,853 | 8/1962 | Horner et al. | 56/320.2 X |
| 3,057,140 | 10/1962 | Ridenour et al. | 56/17.5 X |
| 3,091,073 | 5/1963 | Strasel | 56/17.5 X |
| 3,106,812 | 10/1963 | McDonagh | 56/320.1 |
| 3,132,457 | 5/1964 | Slemmons | 56/202 |
| 3,186,152 | 6/1965 | Epstein | 56/320.2 X |
| 3,190,061 | 6/1965 | Gilbertson | 56/17.5 X |
| 3,541,771 | 11/1970 | Schulz | 56/320.2 X |
| 3,648,445 | 3/1972 | Efflandt | 56/320.2 |
| 3,706,190 | 12/1972 | Taub | 56/202 X |

Primary Examiner—Robert Peshock
Assistant Examiner—J. A. Oliff
Attorney, Agent, or Firm—Cyril A. Krenzer

[57] ABSTRACT

A rotary mower having a handle, a housing mounted on wheels, an engine mounted in a depression in the top of said housing, a shaft extending vertically from said engine into said housing, a circular chamber inside said housing, and a blade or other cutting means mounted on the lower end of said shaft for rotation inside said housing below said depression and a major part of said chamber. Enclosing the underside of said housing is a plate with a deflection along its rear edge extending under the rear portion of said housing and forwardly beyond said shaft but rearwardly from the forward end of the path of rotation of said blade, and a plurality of spaced rods extending forwardly from the forward edge of said plate to a point near the forward edge of said housing. A crossbar member is provided adjacent the forward ends of said spaced rods and a rotary brush means powered by the rotation of one of said wheels is provided inside and near the forward end of said housing above said spaced rods.

4 Claims, 8 Drawing Figures

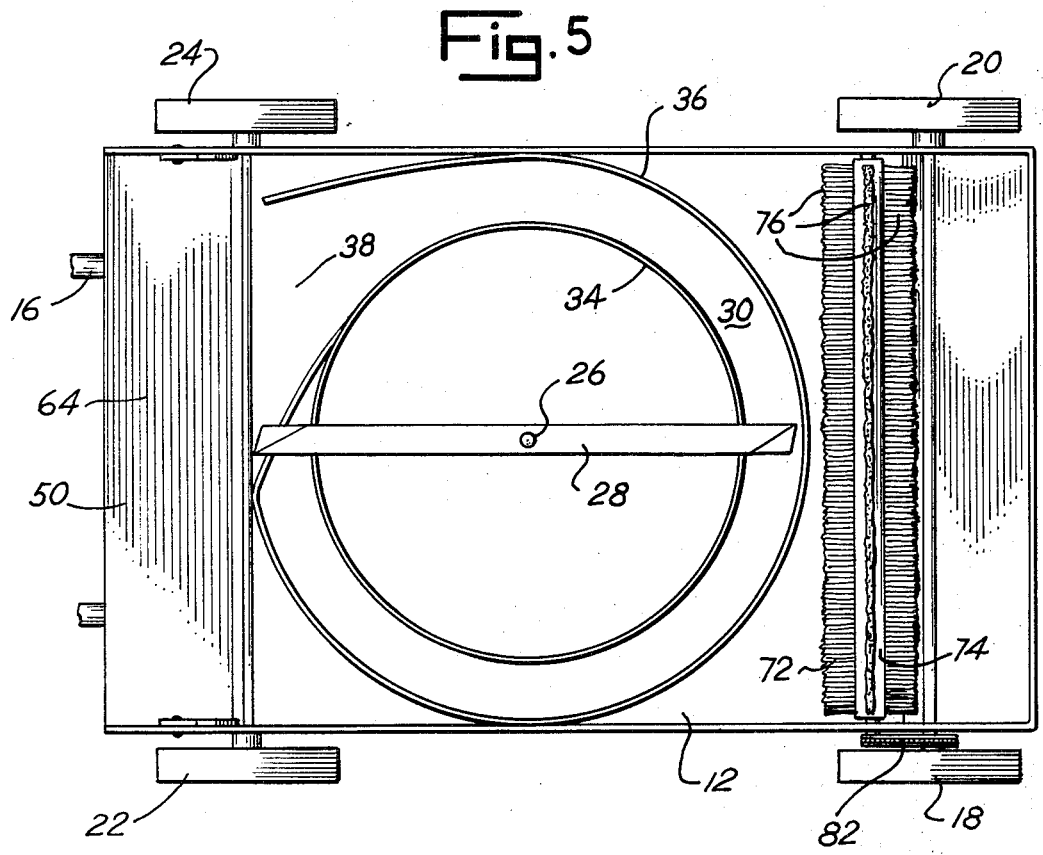
Fig. 5
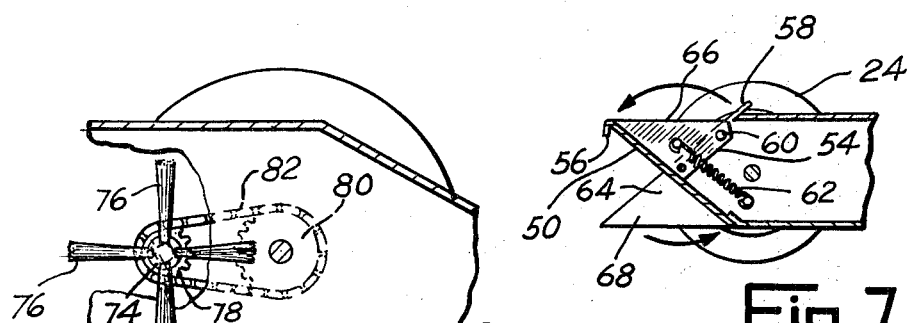
Fig. 6
Fig. 7
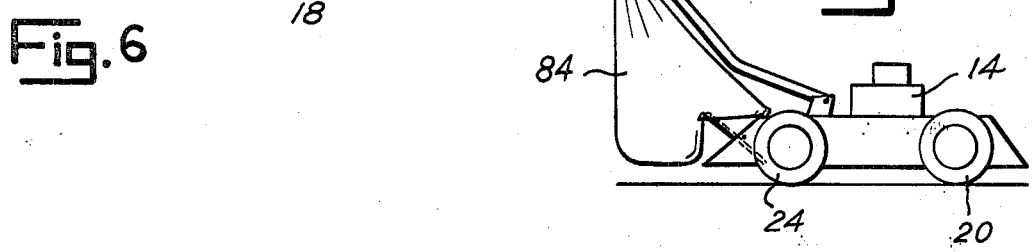
Fig. 8

ROTARY MOWER

The conventional rotary mower is basically a simple machine, consisting essentially of a sharpened blade attached to the vertically protruding shaft of a small engine mounted on a housing which forms a suitable carriage adapted to be pushed along the ground so that the blade rotates inside the housing a predetermined distance above the ground. In the standard rotary mower the bottom of the housing is open, a circular chamber is provided inside the housing to channel the flow of air caused by the rotating blade, and a port is usually provided along one side of the housing and at the end of the chamber so that grass cuttings are discharged either directly away from the mower or into a bag attached to the housing at the port.

Very easy to operate, the rotary mower is at the same time an extremely efficient mechanism; tremendous cutting power is generated by the high angular momentum of the blade, which is made to rotate at speeds up to 3,800 revolutions per minute. Maximum operating speed, moreover, is frequently recommended by the manufacturer of the mower.

At even 3,000 revolutions per minute, however, every point in the circle described by the rotating blade is exposed to an edge of that blade 100 times per second. In addition, an object struck by the rotating blade can be propelled with a force greater than that of a discharged bullet; many injuries involving projected missiles, in fact, occur after these objects have ricocheted off the ground under the mower housing, usually around the area of the discharge port.

The rotary mower, therefore, is an inherently dangerous machine, requiring extreme care and caution on the part of the operator, a fact long recognized by the mower industry, as is evident from the detailed safety instructions included in the owner's manual accompanying every new rotary mower sold.

Despite these warnings, however, there have annually been thousands of injuries, and in some cases even death, resulting from accidents involving rotary mowers.

In cases of injury resulting from direct contact with the rotating blade, the digit(s) or limb involved is seldom severed, but is frequently so irreparably mangled that amputation is the only practical treatment. Injuries caused by objects ejected from a mower after being struck by the rotating blade are often more serious. Finally, many injuries caused by rotary mowers are never reported at all.

In view of the foregoing, varied attempts have been made and are being made to improve the safety of the rotary mower. A notable advancement has been made, for instance, in preventing the possibility of the operator's feet contacting the blade or being struck by a discharged object while he is walking behind the mower. Accidents resulting from these two causes, however, constitute a small minority of the total number of mower-related accidents, and, at least in the latter case, inflict relatively minor injury. Little has been done to prevent accidents caused by direct contact with the rotating blade and by objects lifted into and then projected from the rotary mower after striking the rotating blade.

Accordingly, it is one of the principal objects of this invention to provide a rotary mower in which the underside of the housing is substantially enclosed by a plate, thereby greatly reducing the possibility of foreign objects coming into contact with the blade, of accidental injury resulting from direct contact with the blade, and of accidental injury resulting from the ejection under the mower housing of stones, nails and other foreign objects, and thereby increasing, by reason of the smaller intake opening, the force of the airflow which lifts the blades of grass into the rotating blade, thus making feasible lower blade speeds.

It is another object of this invention to provide a rotary mower in which the plate substantially enclosing the underside of the housing has an upwardly deflected edge intercepting the blade tip and the bottom edge of the mower housing, thereby eliminating the possibility of stones, nails and other foreign objects being discharged directly under the mower housing in the direction of the operator, and causing all foreign objects struck by the rotating blade in this direction to contact the inner wall of the mower housing, thus substantially reducing or eliminating the danger therefrom.

Still another object of this invention is to provide a rotary mower in which the cutting area and any other area underneath the rotating blade not covered by the plate on the underside of the housing is enclosed by a series of rods, thereby further reducing the possibility of foreign objects coming into contact with the blade, of accidental injury resulting from direct contact with the blade, and of accidental injury resulting from the ejection under the mower housing of stones, nails and other foreign objects, and thereby supporting, aligning and facilitating the lift of blades of grass entering and in the cutting area.

A further object of this invention is to provide a rotary mower in which the discharge port is at least as wide as the length of the blade, thereby causing all discharged matter to be ejected at substantially reduced speeds, and thereby reducing the possibility of clogging in the discharge area.

Another object of this invention is to provide a rotary mower in which the discharge port is equipped with an adjustable cover which directs all discharged matter either downwardly toward the ground or upwardly into a bag when it is attached at the discharge port, thereby eliminating the possibility of accidental injury caused by the ejection of foreign objects through the discharge port and preventing the possibility of accidental injury from contact with the rotating blade in the area of the discharge port.

Yet another object of this invention is to provide a rotary mower in which the adjustable cover of the discharge port is held preferably by means of a spring in the closed position at all times other than when the bag is attached, thereby preventing the discharge of any matter through the open port.

Another object of this invention is to provide a rotary mower in which the bag attached to the discharge port is held in place by the discharge port cover when locked in the open position and can be removed only when the cover is released from its locked position, thereby eliminating the possibility of accidents caused by objects being ejected through the open port while the bag is being emptied.

A further object of this invention is to provide a rotary mower in which a rotating brush means is mounted inside the housing for sweeping the area and separating, aligning and lifting the blades of grass as they enter the cutting area, thereby greatly reducing the possibility of foreign objects being propelled by the rotating blade and providing an even, quality cut over the area being mowed.

Still another object of this invention is to provide a rotary mower in which a rod is mounted inside the housing so that it is struck by the bristles of the rotating brush means, thereby cleaning said bristles.

It is another object of this invention to provide a rotary mower which is simple in construction and operation and safe under all normal operating conditions, and which can be maintained at optimum operating efficiency with little servicing or other attention.

Additional objects and advantages of the invention will become apparent from the following description and accompanying drawings, wherein:

FIG. 5 is a bottom view of the mower with the closure structures removed therefrom to better show the internal construction of the mower, the section being taken on line 5—5 of FIG. 4;

FIG. 6 is an enlarged fragmentary, cross-sectional view of a portion of the mower taken on line 6—6 of FIG. 3, illustrating the construction and operation thereof;

FIG. 7 is a fragmentary, vertical cross-sectional view of the rear portion of the mower shown in preceding figures, the section being taken on line 7—7 of FIG. 3; and FIG. 8 is a side elevational view of the mower embodying the present invention, illustrating the manner in which it is operated in combination with a grass catching bag.

Figure 1:
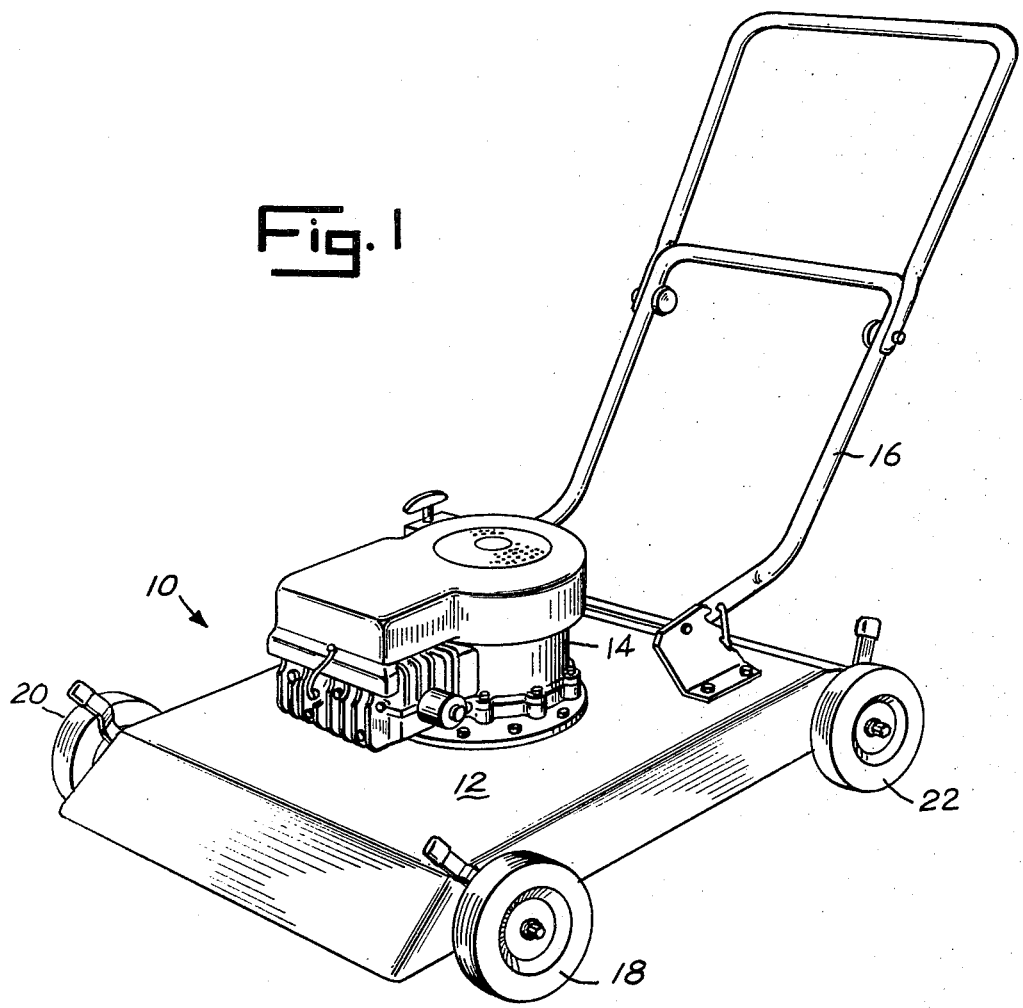
FIG. 1 is a perspective view of a rotary type lawn mower embodying the present invention.
Figure 2:
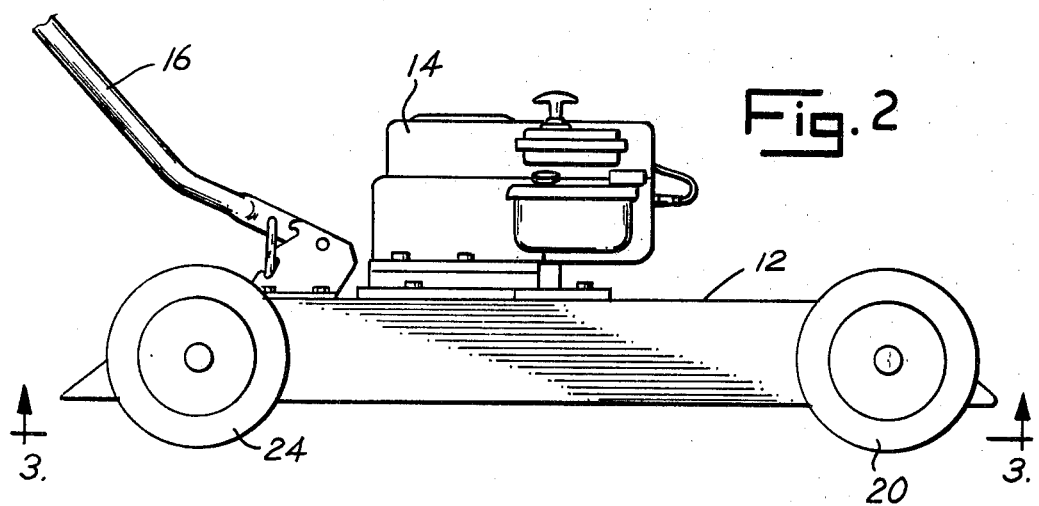
FIG. 2 is an elevational view of the side of the mower opposite that shown in FIG. 1.

Referring more specifically to the drawings and to FIG. 1 in particular, numeral 10 designates generally the rotary mower embodying the present invention, 12 the mower housing, 14 the engine, 16 the handle connected to the upper side of the housing, 18 and 20 the front wheels, and 22 and 24 the rear wheels of the mower. The engine is secured to the upper side of the housing and has a vertically projecting shaft 26 extending into the housing. A blade 28 mounted on the lower end of the shaft is disposed inside the housing. Included within the housing is an air chamber 30 for carrying the grass cuttings to discharge openings 66 or 68. The blade may be a single, substantially straight piece of metal with a cutting edge at each end, such as that shown in the drawings, a plurality thereof, or one having cutting edges attached to a disc. The mower is pushed or powered along the ground over the area to be mowed, and as the blade rotates it creates an upward airflow which draws the blades of grass into the cutting area.

The features thus far mentioned, with the exception of the plurality of discharge openings provided in the present invention, are conventional component parts of most rotary mowers, and may be changed or varied as necessary in order to properly adapt them to the present invention when applied to various makes and models of rotary mowers.

Air chamber 30 is formed substantially by generally circular baffles 34 and 36; engine 14 is mounted inside baffle 34 or in a depression in the top of the housing, the sides of which depression then replace the circular portion of baffle 34, or a plate 32 is attached to the lower edge of baffle 34, thereby preventing grass cuttings from clogging or accumulating inside the depression or inner baffle.

The conventionally exposed blade 28, the major danger area of the rotary mower, is covered by a panel 40 enclosing at least the rear portion of the rotational area of the blade and preferably a substantial portion of the forward rotational area of the blade. A lip 42 is provided along the rear edge of panel 40 to cause the ejection of all foreign objects struck by the blade onto the inclined surface provided by panel 50. Extending forwardly from the edge of panel 40 is a plurality of rods 44 joined to the forward end of the panel or to a crossbar at said forward end supported by the housing, and supported by crossbar 70, forming essentially a rigid structure fully enclosing at least that portion of the forward rotational area of the blade not enclosed by panel 40, with the exception of the spaces or interstices 46 between rods 44.

Panel 40, together with lip 42 and rods 44, as can readily be seen, thereby prevents the possibility of a hand or foot coming into contact with the rotating blade, prevents the possibility of foreign objects being ejected at the operator of the mower, substantially reduces the possibility of foreign objects being lifted into contact with the blade and the further possibility of their being ejected from the mower housing, while at the same time enhancing the performance of the present invention by causing an increase in the upward airflow through the smaller intake area, permitting lower blade speeds, by providing means for aligning and supporting the blades of grass being cut, and by assisting in the safe and effective discharge of all matter from the mower.

Figure 3:
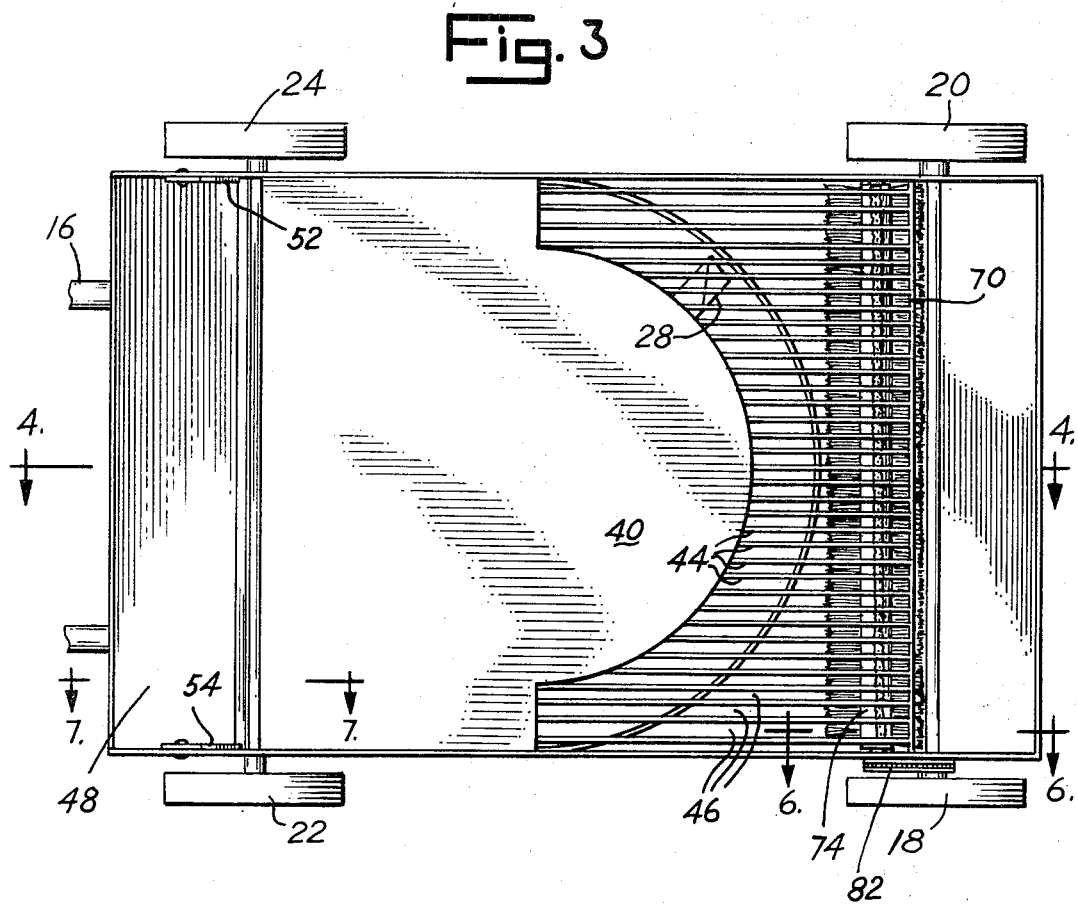
FIG. 3 is a bottom view of the mower, the section being taken on line 3—3 of FIG. 2.

A suggested amount of blade exposure above panel 40 and rods 44 is shown in FIG. 3 in which an end of the blade projects beyond the forward edge of the panel, above the rods and below the forward portion of air chamber 30.

The term "rod" as used herein is intended to include any type of elongated member such as a rod, wire, bar or strip of metal or other material spaced from one to another to form a grill-type structure.

The ends of baffles 34 and 36 form a wide discharge passage 38 which substantially reduces the speed of all matter carried by the airflow along the air chamber to discharge opening 66 or 68 provided in the housing, each of which is at least as wide as the diameter of the rotational area of the blade, thereby greatly reducing the possibility of high speed ejection of foreign objects from the mower, the possibility of the air chamber becoming clogged and having to be cleaned, and possible injuries therefrom.

Figure 4:
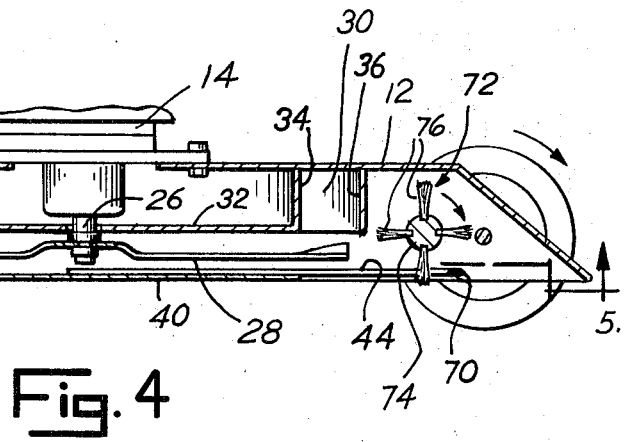
FIG. 4 is a vertical cross-sectional view of the mower shown in the preceding figures, the section being taken on line 4—4 of FIG. 3.

A pivoted deflector 48 having a main panel 50 and inwardly extending members 52 and 54 is mounted across the opening 64 of the housing. The deflector is securable in the open position, creating discharge port 66 as shown in FIG. 7, preferably by means of a spring-loaded pin 60 in the housing; at all other times it is caused to return to and remain in the closed position, creating discharge port 68 as shown in FIG. 4, preferably by means of a spring 62 mounted between the deflector and the housing.

When the mower is to be used for mulching, deflector 48 is pivoted closed, thus providing the downwardly positioned opening 68 through which the grass is discharged. An object, upon striking the inner surface of the closed deflector, rebounds downwardly to the ground, and hence the possibility of its being directly ejected or ricocheted off the ground behind the mower is eliminated.

When the mower is to be used in combination with a grass catcher, such as bag 84 as shown in FIG. 8, deflector 48 is pivoted open so that the lower edge thereof engages lip 42, and is secured by means of pin 60, thereby closing the downwardly facing opening and providing opening 66, as well as means for securing the opening of attached bag 84.

The opening of bag 84, hemmed with a flexible band, is attached to the housing around flange 58 provided along the rear edge of the top of the housing and flange 56 provided along the top edge of deflector panel 50, as shown in FIG. 7, and is held in place by the pressure created when deflector 48 is secured in the open position. The bag is supported by handle 16 and can readily be emptied by disengaging it from around flanges 56 and 58 after deflector 48 has been released from its secured open position.

In order to clear the area being mowed of foreign objects and to assure more effective cutting under all conditions, an adjustable rotor 74 having a plurality of bristles 76 forming a rotary brush means 72 is provided inside the housing forward of the blade and extending across and supported by the housing. The bristles are sufficiently long so as to extend below the housing in the manner illustrated in FIG. 4. As the brush means rotates the bristles sweep the grass, thereby reducing the possibility of foreign objects coming into contact with the rotating blade, and separate, lift and align the blades of grass, thereby causing the grass to be cut with great uniformity and effectiveness.

A crossbar 70 is provided within the rotational area of the bristles of brush means 72, inside, extending across and supported by the housing, thereby providing a self-cleaning means for the rotary brush means.

The rotary brush means is preferably driven by a sprocket 80 mounted on the hub of one of the front wheels, a sprocket 78 mounted on the end of the rotor 74 of the rotary brush means, and a chain 82 trained on the two sprockets. The brush means rotates whenever the rotary mower is moved along the ground by the operator.

In the use and operation of the present mower, as the mower is pushed over the grass the rotary brush means 72 is rotated by a drive connected to wheel 18; the blade 28 rotates inside the housing between the enclosed bottom of plate 32 and the upper surfaces of panel 40 and rods 44. The grass is cut in the area above rods 44 and the forward edge of panel 40, and the cuttings are carried by the airflow from the rotating blade into and along air chamber 30 formed by baffles 34 and 36. They are then discharged through discharge passage 38 formed by the ends of the baffles and deflected off lip 42 and then panel 50 either downwardly through opening 68 onto the ground or upwardly through opening 66 into attached bag 84.

It is seen that the rotary brush means clears the area to be mowed of foreign objects and uprights the blades of grass for effective cutting, reducing the possibility of injury from discharged objects and minimizing or eliminating the possibility of uncut rows resulting from the mower wheels depressing the grass. Panel 40 and rods 44 virtually prevent the possibility of accidental injury from direct contact with the rotating blade, while at the same time increasing the efficiency of the mower and preventing any sizable foreign objects likely to cause injury or damage from entering the housing. Further, if any foreign objects, such as pieces of wire or small nails, should pass between rods 44 and thereafter be discharged through air chamber 30, they are deflected off lip 42 and against panel 50 either downwardly onto the ground or upwardly into bag 84, thus eliminating the possibility of their being discharged directly from or ricocheted off the ground below the mower housing.

The protective panel 40, with or without rods 44, can be adapted to various makes and models of rotary mowers, and, in view of the large discharge openings 66 and 68, the likelihood of air chamber 30 clogging is remote. Thus the mower has a self-cleaning feature which virtually eliminates the repeated necessity of reaching into the air chamber to remove grass, as is the case with conventional mowers.

While only one embodiment of the present rotary mower has been described in detail herein, various changes and modifications may be made without departing from the scope of the invention.

I claim:

1. A rotary mower comprising a housing having wheels and a handle, an engine mounted on the upper side of said housing and having a shaft extending vertically into said housing, a blade mounted on the lower end of said shaft for rotation in a horizontal plane in said housing, means in the rear of said housing defining a discharge port approximately equal in width to the length of said blade, a generally circular chamber inside said housing, said chamber being formed of first and second generally circular baffle means extending downward from said housing, said chamber having an enlarged opening to the rear to mate with said discharge port, and a panel mounted on the bottom of the housing enclosing at least the 180° of the rotational area of said blade rearward of said shaft.

2. A rotary mower as define in claim 1 additionally comprising a pivoted plate mounted across said discharge port, said pivoted plate being securable in either the closed or open position.

3. A rotary mower as defined in claim 2 wherein said panel on the bottom of the housing includes an upwardly extending angular portion along substantially all its rearward edge, said upwardly extending angular portion intercepting the line between the end of said blade and the bottom edge of the rear of said housing when said blade is rearward of said shaft.

4. The rotary mower as defined in claim 1 additionally comprising a plurality of spaced rods extending forwardly from the forward edge of said bottom panel and enclosing said portion of the 180° of said area forward of said shaft not enclosed by said panel.

* * * * *